United States Patent [19]

Engström et al.

[11] Patent Number: 4,934,281

[45] Date of Patent: Jun. 19, 1990

[54] CIRCULATING FLUIDIZED BED REACTOR AND A METHOD OF SEPARATING SOLID MATERIAL FROM FLUE GASES

[75] Inventors: Folke Engström; Kaj O. Henricson; Ragnar G. Lundqvist, all of Kotka, Finland

[73] Assignee: A. Ahlstrom Corporation, Karhula, Finland

[21] Appl. No.: 265,340

[22] Filed: Oct. 27, 1988

Related U.S. Application Data

[63] Continuation of Ser. No. 917,089, filed as PCT FI85/00098 on Dec. 9, 1985, published as WO87/03668 on Jun. 18, 1987, abandoned.

[51] Int. Cl.$^5$ ............................................... F23B 1/00
[52] U.S. Cl. ..................................... 110/216; 110/245; 431/7; 122/40; 55/459.1; 406/173
[58] Field of Search ................ 422/147, 144; 55/459.1

[56] References Cited

U.S. PATENT DOCUMENTS

| | | |
|---|---|---|
| 2,719,631 | 10/1955 | Vicard ............................ 55/459 R X |
| 2,901,420 | 8/1959 | Evans . |
| 2,994,666 | 8/1961 | Hinds ............................. 55/459 R |
| 3,058,817 | 10/1962 | Irani . |
| 3,116,238 | 12/1963 | Van Etten ....................... 55/459 R |
| 3,159,494 | 12/1964 | Lawrence et al. . |
| 3,677,715 | 4/1972 | Morrison et al. . |
| 3,698,874 | 7/1972 | Zenz . |
| 3,823,693 | 7/1974 | Bryers et al. . |
| 3,897,739 | 8/1975 | Goldbach . |
| 4,001,121 | 1/1977 | Bielefeldt ....................... 55/459 R X |
| 4,103,646 | 3/1978 | Yerushalmi et al. . |
| 4,108,778 | 8/1978 | Lambert et al. ................ 55/459 R X |
| 4,154,581 | 1/1979 | Nack et al. . |
| 4,165,717 | 8/1979 | Reh et al. ........................ 431/7 X |
| 4,198,290 | 4/1980 | Sommers ...................... 55/459 R X |
| 4,205,965 | 6/1980 | Bielefeldt ..................... 55/459 R X |
| 4,300,625 | 11/1981 | Mikhailov et al. . |
| 4,311,670 | 1/1982 | Nieminen et al. . |
| 4,312,301 | 1/1982 | Anson . |
| 4,404,095 | 9/1983 | Haddad et al. ................ 208/164 X |
| 4,419,966 | 12/1983 | Jenkins ......................... 110/245 X |
| 4,427,053 | 1/1984 | Klaren . |
| 4,473,033 | 9/1984 | Strohmeyer, Jr. . |
| 4,482,451 | 11/1984 | Kemp ............................ 422/144 X |
| 4,522,154 | 6/1985 | Taylor et al. .................. 122/4 D |
| 4,594,967 | 6/1986 | Wolowodiuk . |
| 4,664,887 | 5/1987 | Engstrom . |
| 4,672,918 | 6/1987 | Engstrom et al. ............. 122/4 D |
| 4,699,068 | 1/1987 | Engstrom . |
| 4,708,092 | 9/1987 | Engstrom . |

FOREIGN PATENT DOCUMENTS

| | | |
|---|---|---|
| 0126001 | 11/1984 | European Pat. Off. . |
| 0033808 | 3/1985 | European Pat. Off. . |
| 115328 | 11/1899 | Fed. Rep. of Germany . |
| 598423 | 5/1932 | Fed. Rep. of Germany . |
| 1442745 | 2/1969 | Fed. Rep. of Germany . |
| 1767699 | 9/1971 | Fed. Rep. of Germany . |
| 812596 | 9/1982 | Finland . |
| 1325323 | 3/1963 | France . |
| 0148305 | 9/1983 | Japan ............................ 431/170 |
| SE80/00153 | 12/1980 | PCT Int'l Appl. . |
| 85/00027 | 9/1985 | PCT Int'l Appl. . |
| 82068883 | 12/1982 | Sweden . |
| 879144 | 11/1981 | U.S.S.R. . |
| 2034448 | 11/1978 | United Kingdom . |
| 2018961 | 10/1979 | United Kingdom ........... 122/4 D |
| 2038670 | 7/1980 | United Kingdom . |
| 2104408 | 3/1983 | United Kingdom . |
| 2159726 | 12/1985 | United Kingdom . |
| 2160119A | 12/1985 | United Kingdom . |
| WO85/04117 | 9/1985 | World Int. Prop. O. . |

Primary Examiner—Carl D. Price
Attorney, Agent, or Firm—Nixon & Vanderhye

[57] ABSTRACT

A circulating fluidized bed reactor comprises a separator including a vortex chamber adjacent the top of the reactor for separating solid material from the flue gases of the reactor. A channel directs flue gases discharged from the reactor and adjacent the top of the reactor in a downward direction. A main portion of the solid material is separated from the gases by a change of flow direction after which the solid material is returned to the lower part of the reactor. The main portion of the gases is directed, after the change of direction, to the vortex chamber where further separation of solid material is effected and the separated solid material is returned to the reactor.

16 Claims, 7 Drawing Sheets

CIRCULATING FLUIDIZED BED REACTOR AND A METHOD OF SEPARATING SOLID MATERIAL FROM FLUE GASES This is a continuation of application Ser. No. 06/917,089, filed as PCT FI85/00098 on Dec. 9, 1985, published as WO87/03668 on Jun. 18, 1987, now abandoned.

TECHNICAL FIELD

The present invention relates to a circulating fluidized bed reactor which comprises a vertical reactor chamber, a separator provided with a vortex chamber for separation of solid material from the gases discharged from the reactor chamber, a channel for the gases discharged from the reactor chamber, a channel for the purified gases discharged from the vortex chamber and a duct for recycling the separated solid material to the reactor.

It is an object of the invention to provide a circulating fluidized bed reactor by which solid material can efficiently be separated from the flue gases discharged from the reactor chamber of the reactor and recycled to a desired point in the reactor.

BACKGROUND ART

Circulating fluidized bed technique has for a long time been applied e.g. in calcinators and recently to a larger extent in various reactors such as combustion furnaces and gasifiers. The standard practice for carrying out the separation of the circulating solid material from the flue gases has been to use a conventional cyclone separator having a hopper-shaped bottom. The cylindrical vortex chamber of the cyclone is provided with a gas discharge pipe which guides the gases upwards and the solid material is recycled to the reactor through a stand pipe via a gas trap. The gas trap is employed to prevent reactor gases from flowing into the cyclone through the stand pipe. A mechanical trap is most commonly used as a gas trap or in more advanced applications a fluidized bed of sand in a U-pipe. Especially in high temperature reactors the solid material recycling system becomes complex and expensive. Part of the air required for fluidizing the gas trap flows upwards in the stand pipe which has a detrimental effect on the separation of solid material, in particular on the separation of light and fine particles. Furthermore, a rising gas flow decreases the transport capacity of the stand pipe.

As is known, a substantial underpressure and a high axial flow velocity are created in the center of a conventional cyclone due to which the cyclone tends to suck from the stand pipe. A suction flow generated in this way has usually no tangential velocity, thus almost all the solid material the flow carries with it is transported out through the center pipe of the cyclone. A recycling system provided with a conventional cyclone is therefore very sensitive to the suction flow from the stand pipe and requires a reliable gas trap.

In steam boilers, the use of a conventional cyclone results in a disadvantageous design as a conventional cyclone devices the boiler into a separate combustion chamber and a convection part after the cyclone between which the equipment for recycling the solid material must be installed.

Mechanical gas traps are rapidly worn in particular in hot condition and disturbances in their use are frequent.

International patent application no. WO 85/04117 discloses an apparatus in which solid material is separated in a horizontal cyclone which is disposed on top of the reactor, and to the horizontal vortex chamber of which the flue gases flowing upwards from the reactor are tangentially guided.

In the known apparatus the whole solid material amount contained in the flue gases is transported to the vortex chamber of the separator.

DISCLOSURE OF INVENTION

In the method and the apparatus of the present invention, a substantial portion of the solid material contained in the flue gases is separated before the vortex chamber of the separator and does not thus load the vortex chamber. Therefore, higher flow velocities can be applied in the vortex chamber without erosion. A higher flow velocity results in an improved separation capacity which decreases the dust content of the purified gas. Due to the remarkably smaller amount of solid material in the vortex chamber the separation capacity of the separator is higher than that of conventional cyclone separators. The size of the separator is smaller.

According to the present invention, a circulating fluidized bed reactor comprises a channel connected to the upper part of the reactor chamber and guiding the gases discharged from the reactor chamber downward and means for changing the flow direction of gases passing through said channel and for guiding gases to the vortex chamber of the separator.

According to the method of the invention, the flue gases are caused to flow downwards after which the direction of the main portion of the gas flow is changed and the gases are directed to the vortex chamber of the separator while the portion of the flow containing the main portion of the solid material is guided substantially without a change of direction to the solid material recycling channel.

BRIEF DESCRIPTION OF DRAWINGS

The invention is described below more specifically with reference to the accompanying drawings in which.

MODES FOR CARRYING OUT THE INVENTION

Figure 1:
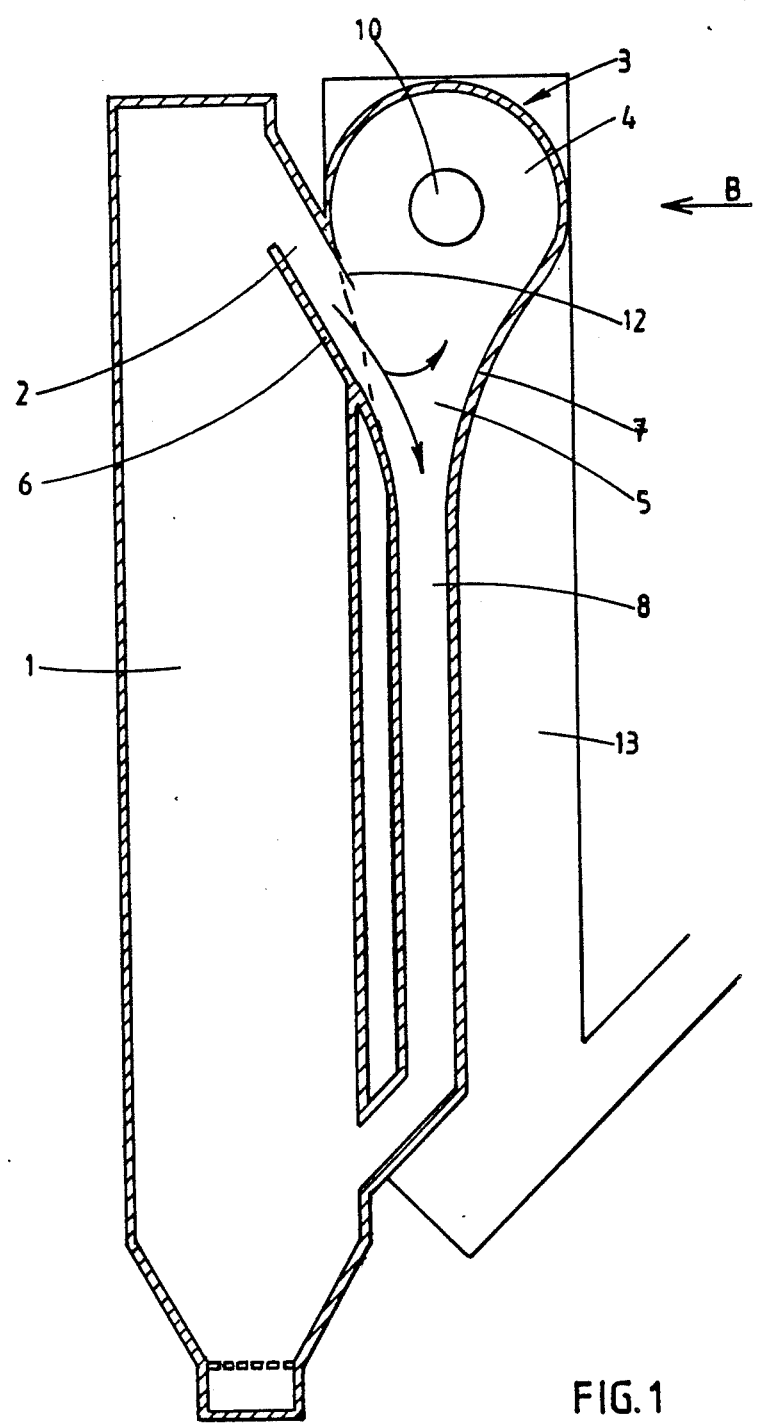
FIG. 1 illustrates an embodiment of the invention in a vertical sectional view along line A—A of FIG. 2.
Figure 2:
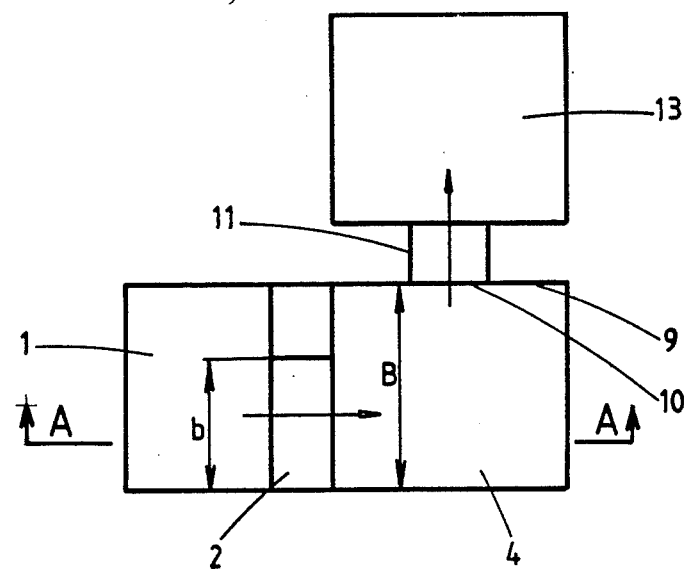
FIG. 2 is a top view of the apparatus of FIG. 1.
Figure 3:
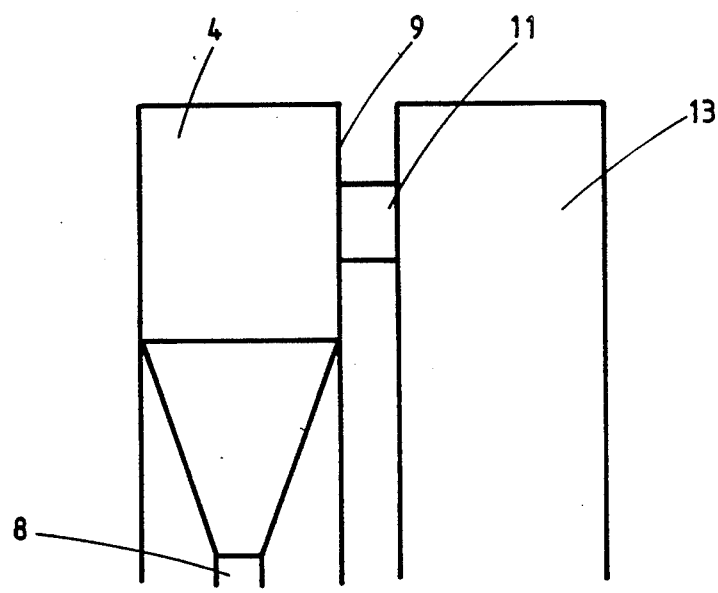
FIG. 3 is a view of a part of FIG. 1 in the direction of arrow B.

In FIGS. 1, 2 and 3, numeral 1 refers to a vertical fluidized bed reactor from the upper part of which the discharged flue gases flow through a downwards directed gas channel 2. A separator 3 is disposed beside the reactor in such a way that its horizontal vortex chamber 4 and the channel 2 open into a downwards tapering space 5 which is formed between a wall 6 of the channel 2 and a wall 7 connected tangentially to the cylindrical part of the vortex chamber. Said space constitutes the inlet of a return duct 8 for solid material. A gas discharge outlet 10 which is concentric with the vortex chamber is arranged in the other end 9 of the separator and is connected through pipe 11 to a convection part 13 of the reactor. The other end of the separator is closed. The width b of the gas channel 2 is smaller than the width B of the vortex chamber 4.

The channel 2 guides the flue gases of the reactor slantingly downwards to the space 5 acting as a pre-separator from which the main portion of the gases is after a change of flow direction directed tangentially upwards to the vortex chamber 4. Due to the change of direction, a major part of the solid material contained in the gases is separated and flows through duct 8 to the reactor. A part of the remaining solid material is separated on the walls of the vortex chamber and is discharged from the vortex chamber at a guiding tongue 12 formed by the vortex chamber and the channel 2, and is impinged against the wall 7 between the vortex chamber and the return duct 8 from which it flows to the return duct. The purified gases are discharged through the outlet 10 to the convection part.

Figure 4:
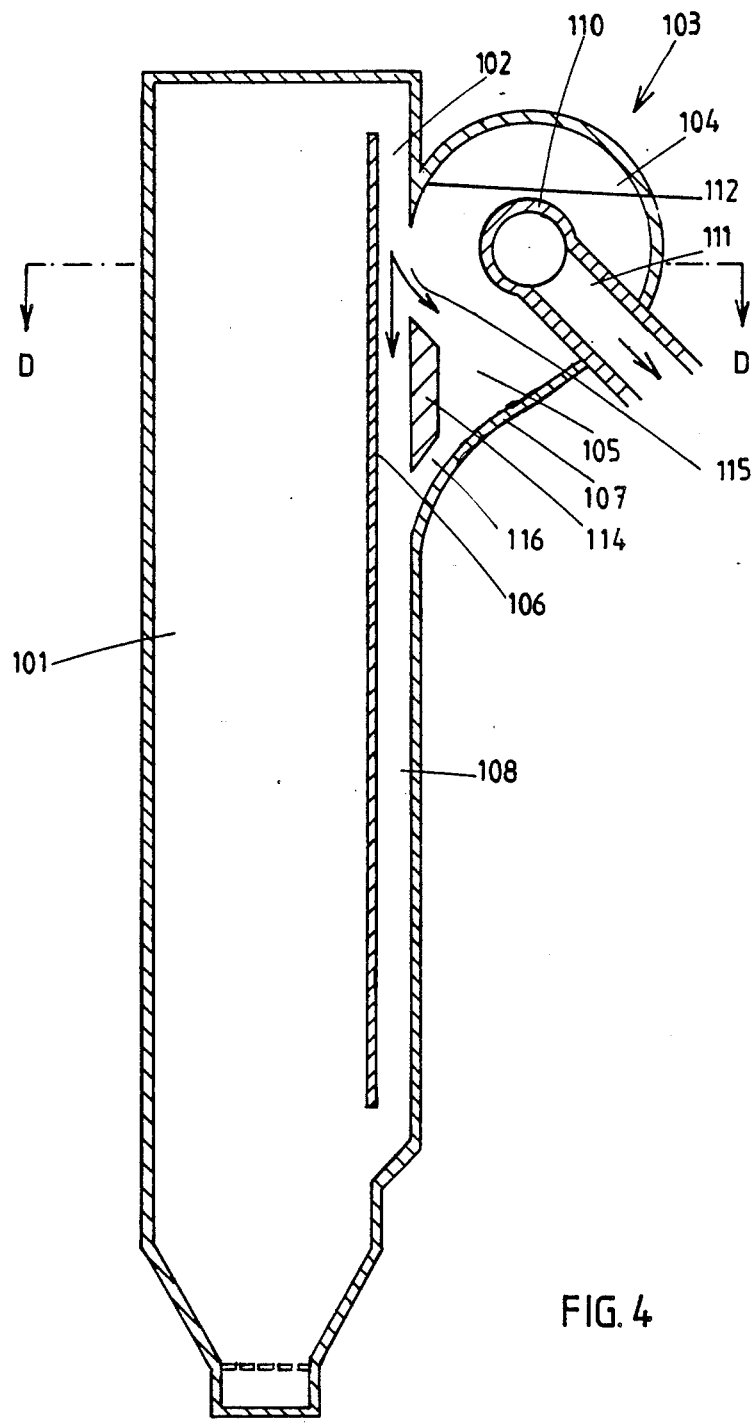
FIG. 4 is another embodiment of the invention in a vertical section along line C—C of FIG. 5.
Figure 5:
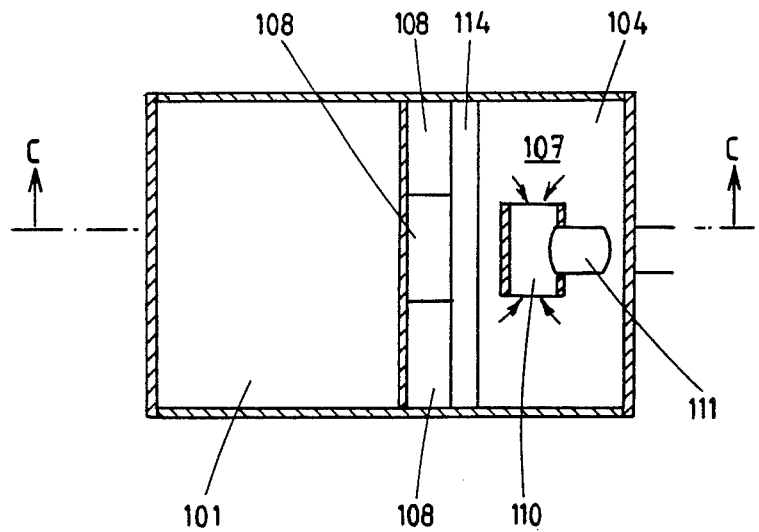
FIG. 5 is a section along line D—D of FIG. 4.

In the embodiment illustrated in FIGS. 4 and 5, the gases are discharged from a reactor chamber 101 of a separator 103 through a channel 102 and the solid material separated from the gases is recirculated to the reactor chamber through a plurality of adjacent return ducts 108. The gases are at first guided straight downwards in the gas channel 102, after which the main portion of the gases change direction and flow to a vortex chamber 104 through an opening 115 between a guide 114 and a tongue 112 formed between the channel 102 and the vortex chamber. The guide 114 is positioned in a tapering space 105 which leads to the return ducts 108 and which is formed by a wall 106 connecting the channel 102 and the ducts 108, and a wall 107 connecting the vortex chamber and the return ducts 108. The object of the guide 114 is to direct the flow containing the main portion of the solid material to the return ducts and to direct, after a change of direction, the main portion of the gases to the vortex chamber. The channel to the vortex chamber and the solid material return duct are arranged in a line in such a way that the solid material flows from one channel to another without changing direction. The solid material separated on the walls of the vortex chamber is discharged to the return ducts through an opening 116 between the guide and the walls 107. The purified gas is discharged through a pipe 111, which extends inside the vortex chamber; a piece of pipe 110, which is parallel with the longitudinal axis of the vortex chamber and both ends of which are open, is connected to the pipe 111.

Figure 6:
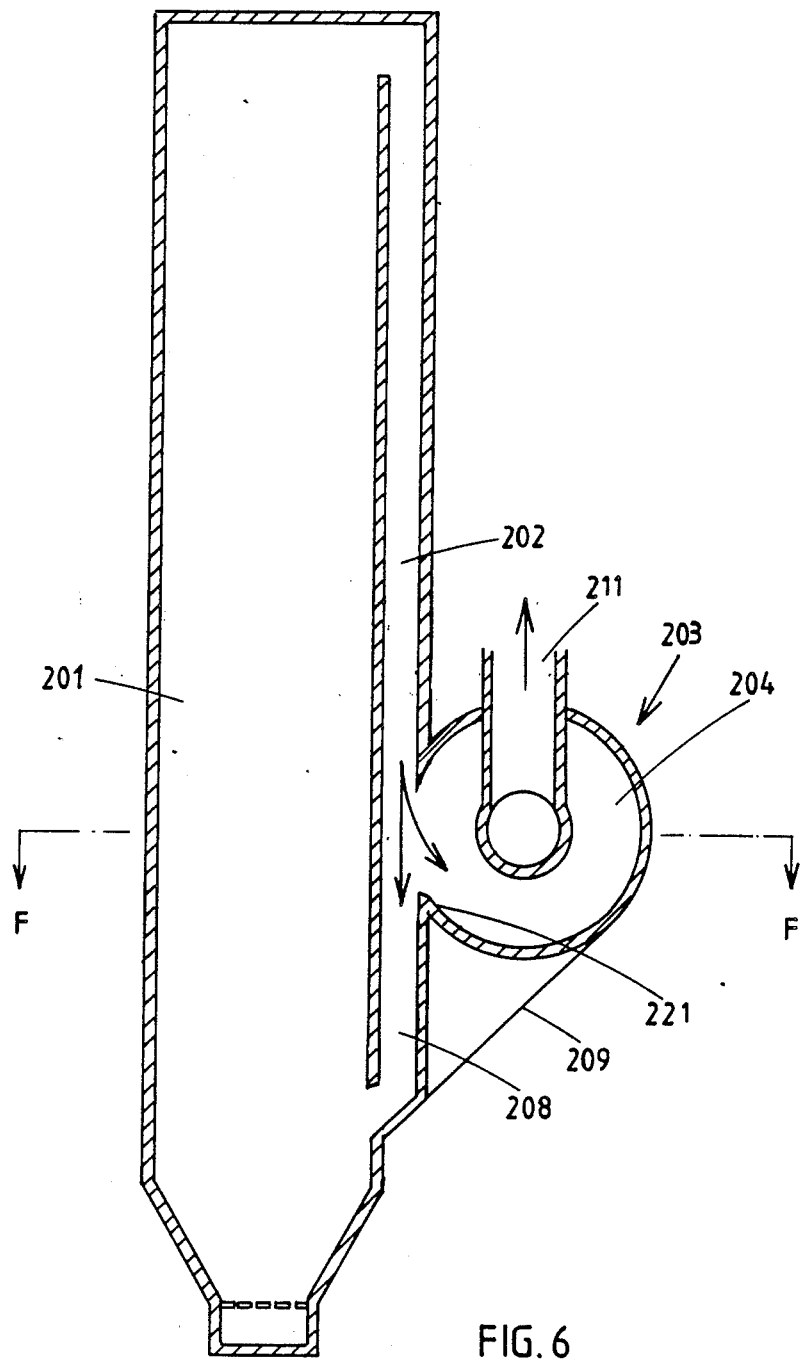
FIG. 6 is an other embodiment of the invention in a vertical section along line E—E of FIG. 7.
Figure 7:
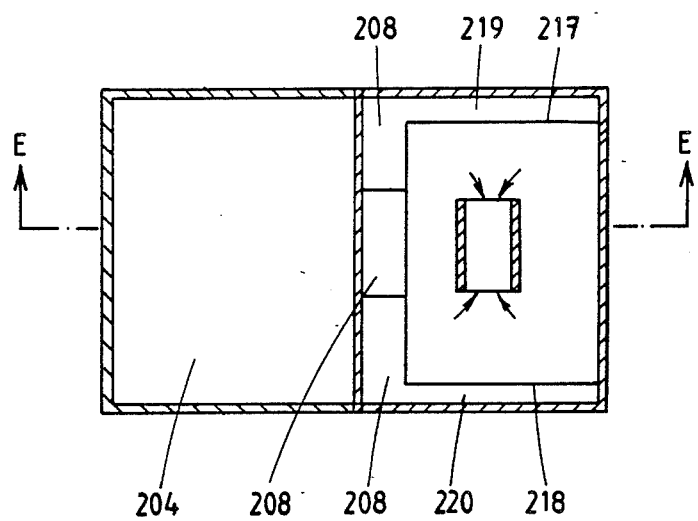
FIG. 7 is a section along line F—F of FIG. 6.

In the embodiment illustrated in FIGS. 6 and 7 a separator 203 is located in the lower part of the reactor. In a channel 202 directing the gases downwards, the long flow distance and the gravitational force create a high velocity and momentum of the solid material at the separator, where the main portion of the gases change direction and flow to a vortex chamber 204 and the main portion of the solid material flows on in a return duct 208 towards the reactor chamber. The vortex chamber and the solid material return duct form between them a tongue 221, the surface of which guiding the flow to the vortex chamber forms an obtuse angle with the channel guiding the gases to the vortex chamber. The solid material separated in the vortex chamber is discharged at the ends 217 and 218 of the chamber and is guided along slanting surfaces 219 and 220 to the return ducts. To ensure transport of the solid material to the ends of the chamber, the bottom of the chamber preferably slants towards the ends. The purified gases are removed via pipe 211 upwards to a convection part positioned above the vortex chamber and not illustrated here.

Figure 8:
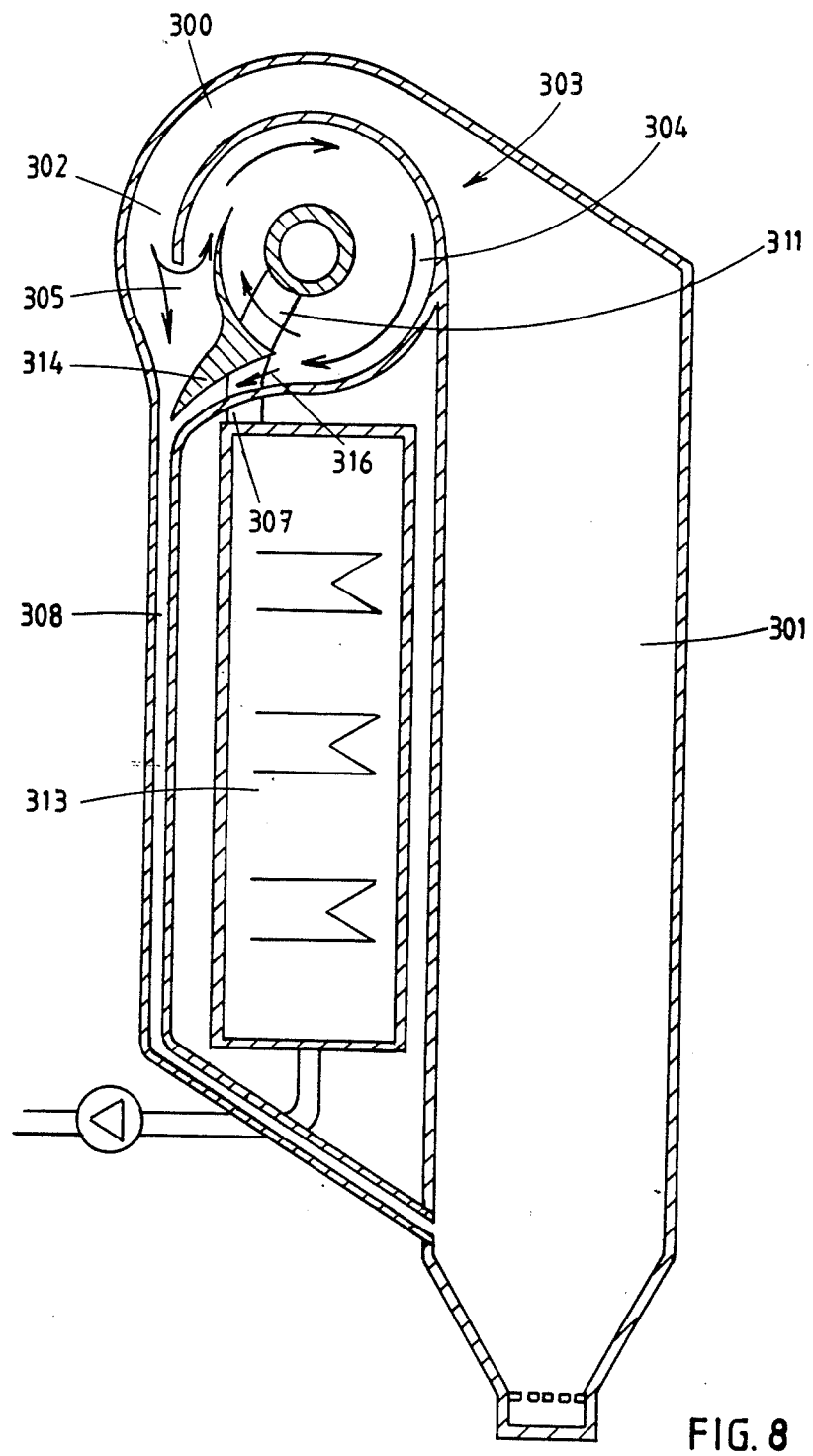
FIG. 8 is a vertical section of yet another embodiment of the invention.

In the embodiment illustrated by FIG. 8, the gases discharged from the reactor chamber 301 pass at a high velocity through a curved channel 300, which is partly surrounding a vortex chamber 304 of a separator 303, to a space acting as a pre-separator from which the main portion of the gases are guided by a guide 314 through a change of direction upwards and tangentially to the vortex chamber 304. The main portion of the solid material is separated in the space 305 and flows substantially without changing direction through a return duct 308 to the reactor chamber. The remaining solid material is separated on the periphery of the vortex chamber and is discharged to the return duct through a channel 316 between the guide 314 and a wall 307 which connects the vortex chamber to the return duct. The purified gas is guided via a pipe 311 extending inside the vortex chamber to a convection part 313 below the vortex chamber.

As to its mode of operation, the system of the present invention differs from the conventional one e.g. in that the solid material is recirculated to the reactor carried by the gas flow (1–10% of the gases). As the channel leading to the vortex chamber is directed towards the inlet of the solid material return duct, the dynamic pressure of the gas and the solid material facilitates circulation of the solid material whereby the separation rate increases.

In the embodiment illustrated in FIG. 8, the circulation direction of the gas in the reactor chamber is opposite to the direction of the change of circulation direction in the pre-separator. In this sense its operation differs from that of the other embodiments and it is more advantageous for the separation of solid material.

INDUSTRIAL APPLICABILITY

The invention is not limited to the embodiments presented here as examples only but it can be modified and applied within the scope of protection defined by the patent claims. E.g., the vortex chamber of the separator can be horizontal or inclined and the vortex chamber can comprise a conical portion. Normally, the solid material separated in the vortex chamber is recirculated to the reactor, although other alternative modes of operation are possible. The solid material separated in the vortex chamber may be returned with the supplied solid material or separately.

We claim:

1. A circulating fluidized bed reactor, comprising:
a vertical reactor chamber having an upper portion;
first separation means including means defining a channel in communication with the upper portion of the reactor chamber for conveying flue gases initially without substantial separation of the solid particles and gases contained in the flue gases, said channel defining means having a generally downwardly directed portion for flowing downwardly therein the flue gases from said reactor chamber and means for dividing the flue gases from said reactor chamber conveyed in said downwardly directed channel portion into a main gas flow having flue gases and solid materials for flow in a first passage and a solid particles laden gas flow containing a higher particle density than the solids in the gas flow for flow in a second passage;

second separation means including a horizontal vortex chamber for separating solid material from said man gas flow discharged from the downwardly directed channel portion;

said first separating means further including means for changing the direction of the main gas flow for flow into said first passage, said first passage being adapted to guide the main gas flow into said vortex chamber in a direction and at a speed to effect separation in the vortex chamber;

first means connecting said second passage and said reaction chamber for conveying the solid particles laden gas flow in said second passage to said vortex chamber; and second means connecting said vortex chamber and said reaction chamber for conveying the solid material separated in said second separation means to said reactor chamber.

2. A circulating fluidized bed reactor according to claim 1 wherein said first passage forms an acute angle with the downwardly directed channel portion.

3. A circulating fluidized bed reactor according to claim 1 wherein the downwardly directed channel portion forms an angle with said second passage.

4. A circulating fluidized bed reactor according to claim 1 wherein said first and second connecting means communicate one with the other prior to conveying the solid particle laden gas and the solid material separated in said second separation means into said reaction chamber.

5. A circulating fluidized bed reactor, comprising:
a vertical reaction chamber;
a channel in direct communication with the upper portion of the reactor chamber for conveying flue gases initially without substantial separation of the solids and gases contained in the flue gases and having a generally downwardly directed portion for conveying such flue gases downwardly;
a first separating means for dividing the flue gases from said reaction chamber in said channel portion into first and second flow streams, each including solid particles;
a horizontal vortex chamber;
means for directing the firs flow stream into said horizontal vortex chamber in a direction and at a speed for separating the solid particles in the first flow stream from the flue gas;
first means for returning the solid particles separated in said vortex chamber to said reaction chamber; and
second means for returning the second flow stream to the reaction chamber.

6. A reactor according to claim 5 wherein said first and second returning means lie in communication one with the other whereby the solid particles returned from said vortex chamber and the second flow stream are commingled prior to their return to said reaction chamber.

7. A reactor according to claim 5 wherein said first separating means divides the flue gases into a first flow stream having solid particles and a second flow stream containing a higher particle density than the density of the solid particles in the first flow stream.

8. A reactor according to claim 5 wherein said first separating means includes means for changing the direction of flow of at least part of the flue gases in the channel for flow into the vortex chamber.

9. A method of separating solid material from the flue gases from the reactor chamber of a circulating fluidized bed reactor having a separator including a horizontal vortex chamber for separating solid material from the flue gases discharged from the reactor chamber and returning the separated solid material to the reactor chamber, comprising:
causing the gases discharged from the reactor chamber to flow downward initially without substantial separation of the solid particles and gases;
positively changing the direction of flow of a portion of the flue gases;
effecting by said change of flow direction an initial separation of the flue gases from the reaction chamber into a first gas flow having solid particles and a second solid particles laden gas flow containing a higher particle density than the solids in the first flow;
directing the first gas flow portion of the flue gases after the change of direction tangentially into the vortex chamber at a velocity to effect separation in the vortex chamber;
separating solid particles from the first gas portion in the vortex chamber;
returning the separated particles from the vortex chamber to the reactor chamber; and
directing the second flow of the solid particles laden gas flow of the flue gases to the reaction chamber substantially without a change of direction.

10. A circulating fluidized bed reactor, comprising:
a vertical reaction chamber;
a channel in communication with the upper portion of the reactor chamber for conveying flue gases and having a generally downwardly directed portion;
a first separating means for dividing the flue gases in said channel portion into first and second flow streams, each including solid particles;
a horizontal vortex chamber;
means for directing the first flow steam into said horizontal vortex chamber in a direction and at a speed for separating the solid particles in the first flow stream from the flue gas;
first means for returning the solid particles separated in said vortex chamber to said reaction chamber; and
second means for returning the second flow stream to the reaction chamber;
said channel defining an arcuate flow path for flowing flue gases in one arcuate direction, said vortex chamber being located adjacent the top of said reactor chamber, said directing means directing the first flow stream into said vortex chamber for flow along an arcuate path in an opposite direction to said one direction.

11. A reactor according to claim 10 wherein said first and second return means converge toward and communicate with one another whereby the solid particles separated in said vortex chamber are commingled with said second flow stream prior to their return to said reactor chamber.

12. A circulating fluidized bed reactor comprising:
a vertical reactor chamber having an upper portion;
first separation means including means defining a channel in communication with the upper portion of the reactor chamber for conveying flue gases, said channel defining means having a generally downwardly directed portion, for dividing the flow in said channel portion into a main gas flow having flue gases and solid materials for flow in a first passage and a solid particles laden gas flow containing a higher particle density than the solids in the gas flow for flow in a second passage;

second separation means including horizontal vortex chamber for separating solid material from flue gases discharged from the reactor chamber;

said first separating means further including means for changing the direction of the main gas flow for flow into said first passage, said first passage being adapted to guide the main gas flow into said vortex chamber;

first means connecting said second passage and said reaction chamber for conveying the solid particles laden gas flow in said second passage to said reactor chamber; and second means connecting said vortex chamber and said reaction chamber for conveying the solid material separated in said second separation means to said reactor chamber;

said downwardly directed channel portion being substantially parallel with said second passage.

13. A circulating fluidized bed reactor comprising:

a vertical reactor chamber having an upper portion;

first separation means including means defining a channel in communication with the upper portion of the reactor chamber for conveying flue gases, said channel defining means having a generally downwardly directed portion, for dividing the flow in said channel portion into a main gas flow having flue gases and solid materials for flow in a first passage and a solid particles laden gas flow containing a higher particle density than the solids in the gas flow for flow in a second passage;

second separation means including a horizontal vortex chamber for separating solid material from flue gases discharged from the reactor chamber;

said first separating means further including means for changing the direction of the main gas flow for flow into said first passage, said firs passage being adapted to guide the main gas flow into said vortex chamber;

first means connecting said second passage and said reaction chamber for conveying the solid particles laden bas flow in said second passage to said reactor chamber; and second means connecting said vortex chamber and said reaction chamber for conveying the solid material separated in said second separation means to said reactor chamber;

said vortex chamber and the downwardly directed channel portion forming a tongue directed towards the inlet of said second passage.

14. A circulating fluidized bed reactor according to claim 13 wherein the vortex chamber and said second passage form a tongue guiding the gases into said first passage and into said vortex chamber.

15. A circulating fluidized bed reactor comprising:

a vertical reactor chamber having an upper portion;

first separation means including means defining a channel in communication with the upper portion of the reactor chamber for conveying flue gases, said channel defining means having a generally downwardly directed portion, for dividing the flow in said channel portion into a main gas flow having flue gases and solid materials for flow in a first passage and a solid particles laden gas flow containing a higher particle density than the solids in the gas flow for flow in a second passage;

second separation means including a horizontal vortex chamber for separating solid material from flue gases discharged from the reactor chamber;

said first separating means further including means for changing the direction of the main gas flow for flow into said first passage, said first passage being adapted to guide the main gas flow into said vortex chamber;

first means connecting said second passage and said reaction chamber for conveying the solid particles laden gas flow in said second passage to said reactor chamber; and second means connecting said vortex chamber and said reaction chamber for conveying the solid material separated in said second separation means to said reactor chamber;

said second connecting means including means adjacent the ends of said vortex chamber for guiding the solid material separated in the vortex chamber for return to the reactor chamber.

16. A circulating fluidized bed reactor comprising:

a vertical reactor chamber having an upper portion;

first separation means including means defining a channel in communication with the upper portion of the reactor chamber for conveying flue gases, said channel defining means having a generally downwardly directed portion, for dividing the flow in said channel portion into a main gas flow having flue gases and solid materials for flow in a first passage and a solid particles laden gas flow containing a higher particle density than the solids in the gas flow for flow in a second passage;

second separation means including a horizontal vortex chamber for separating solid material from flue gases discharged from the reactor chamber;

said first separating means further including means for changing the direction of the main gas flow for flow into said first passage, said first passage being adapted to guide the main gas flow into said vortex chamber;

first means connecting said second passage and said reaction chamber for conveying the solid particles laden gas flow in said second passage to said reactor chamber;

second means connecting said vortex chamber and said reaction chamber for conveying the solid material separated in said second separation means to said reactor chamber; and a guide defining an opening through which the downwardly directed channel portion and the vortex chamber communicate and an opening through which the vortex chamber and said second connecting means communicate, disposed between said second connecting means and the downwardly directed channel portion.

* * * * *